Figure 1:
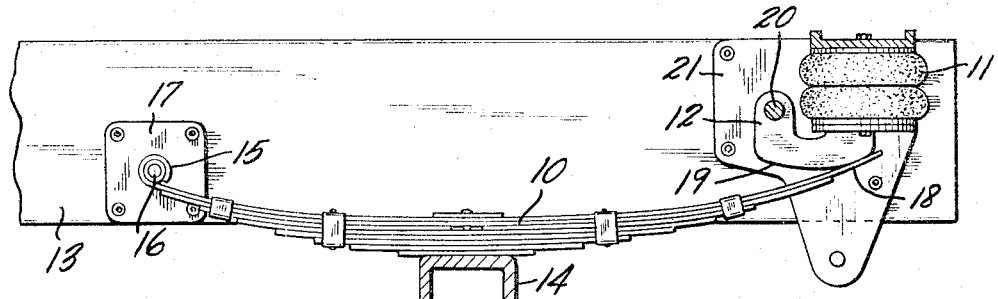

Dec. 27, 1966   H. J. WARMKESSEL   3,294,390

SUSPENSION MEANS

Filed Feb. 11, 1965

INVENTOR.
HARRY J. WARMKESSEL

BY Brumbaugh, Free, Graves & Donohue his ATTORNEYS

United States Patent Office 3,294,390
Patented Dec. 27, 1966

3,294,390
SUSPENSION MEANS
Harry J. Warmkessel, Allentown, Pa., assignor to Mack Trucks, Inc., Montvale, N.J., a corporation of New York
Filed Feb. 11, 1965, Ser. No. 431,871
5 Claims. (Cl. 267—31)

The present invention relates to suspension means operative under variable load conditions and, more particularly, to novel and improved apparatus combining the advantages of conventional deflectable leaf springs and compressible resilient members, such as air springs and the like.

Conventional leaf spring suspensions have an inherent weakness, viz. hysteresis, which is usually most objectionable at light loads and small amplitudes of deflection.

In accordance with the invention, a novel and improved suspension means is provided comprising an elongated leaf spring means susceptible of different degrees of deflection or camber in operative relation with a compressible resilient member such as a relatively small air spring, rubber cushion, coil spring or other suitable flexible medium. A cam means movably couples the opposite end of the compressible resilient member to a fixed pivot point and has a cam surface of predetermined configuration for engaging one end of the leaf spring means at one of a plurality of distinct points along the cam surface dependent upon the degree of deflection of the spring means under different load conditions, whereby the proportionate load applied to the compressible resilient member is a function of the overall load sustained by the cooperative elements of the suspension means and the degree of deflection of the elongated leaf spring means.

The novel and improved composite suspension, when employed for example for the suspension of the rear axle of a vehicle, provides at light loads a limited degree of movement by momentarily deflecting the compressible resilient member without necessarily deflecting the leaf spring. Therefore, the ride is not affected by leaf spring hysteresis.

Under medium load conditions the reduced camber or deflection in the leaf spring along with the reduced operative extent of the compressible resilient member establishes a cooperative relation through the point of engagement of the end of the leaf spring with the cam surface, whereby the total load on the suspension means is proportionately shared by the leaf spring means and the resilient compressible member, and dynamic deflection occurs in the flexible member having the lower hysteresis. At full load, the leaf spring is basically flat, and the point of engagement between the end of the leaf spring and the cam surface lies almost directly beneath the fixed pivot point so as to effectively minimize the work to be done by the compressible resilient member of the composite suspension means. Under this last condition, dynamic loads are great enough to overcome the leaf spring hysteresis.

Figure 2:
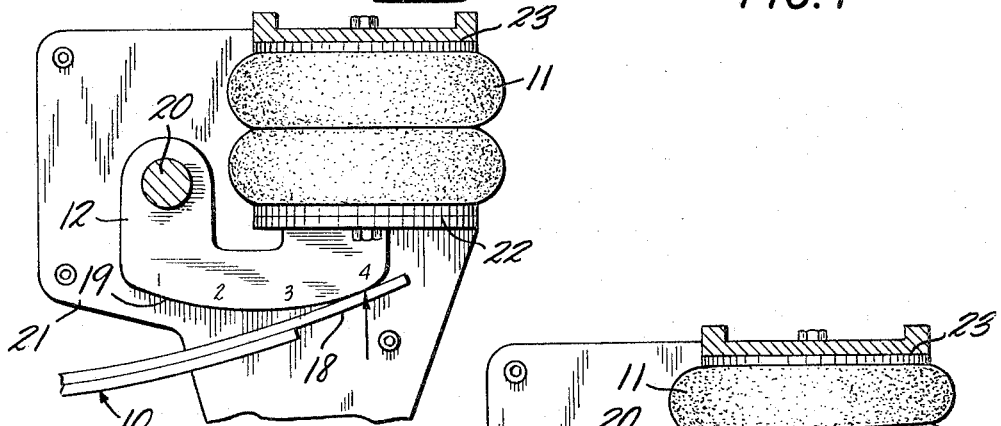
Figure 3:
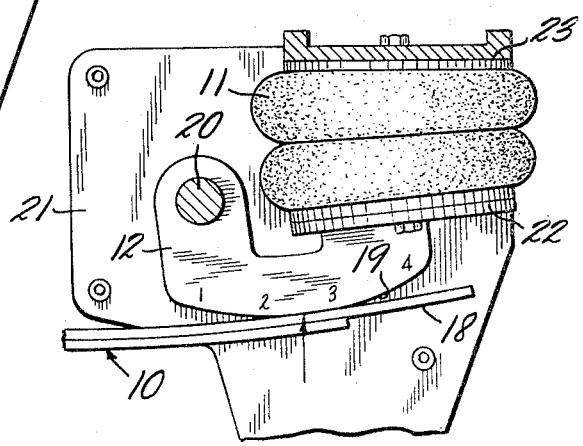
Figure 4:
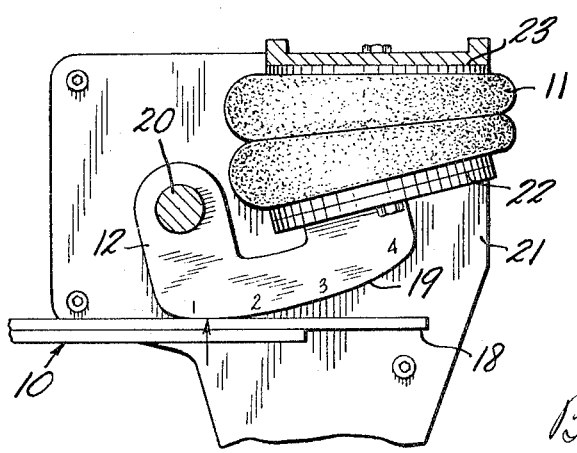

For a more complete understanding of the invention, reference may be had to the following figures of the accompaying drawing, in which:

FIGURE 1 is a side elevational view of an exemplary embodiment of a suspension means, in accordance with the invention, for suspending a rear axle relative to a vehicle frame; and FIGS. 2, 3 and 4 are partial side elevational views depicting the exemplary cooperative relation of the elements of the suspension means under different load conditions, i.e., light, medium and heavy loads, respectively.

In FIG. 1, the composite suspension means includes a conventional leaf spring mechanism 10 and a compressible resilient member such as a bag type air spring 11 cooperatively coupled through a cam means 12 suspended on a vehicle frame member 13 relative to a transverse axle member 14, such as the rear axle of a truck.

The front end or eye of the conventional arched, elongated leaf spring means 10 is pivotally mounted about a stationary pin 16 on a bracket 17 which in turn is fixedly mounted on the longitudinal frame member 13 of the vehicle.

An intermediate point of the leaf spring means 10, which may be any point along the leaf spring as is required for a selected leaf-air distribution, is mounted in a suitable manner upon the transverse axle 14, positioned rearwardly of the fixed pivot point consisting of the stationary pin 16.

The opposite or slipper end 18 of the leaf spring means 10 positioned rearwardly of the transverse axle 14 is adapted to variably engage a cam surface 19 of the cam means 12 at one of a plurality of distinct points along the cam surface 19 dependent upon the degree of deflection or camber of the spring means 10 and the pivotal position of the cam means 12 about a pivot point comprising a stationary pin 20 forming a part of the spring rear bracket 21 fixedly mounted on the longitudinal frame member 13. The opposite end of the cam means 12 is fixedly mounted on and attached to the movable bottom end of the compressible resilient means 11 by means of suitable brackets and plates 22. The upper end of the compressible resilient means 11 is fixedly secured to the spring rear bracket 21 by suitable conventional bracket and plate means 23.

In order to facilitate the understanding of the invention, numerals 1, 2, 3 and 4 have been placed adjacent distinct points of the cam surface 19 in FIGS. 2, 3 and 4. As is seen in FIG. 2, for example, under light loads the slipper end 18 of the leaf spring 10 engages the cam surface 19 at or near the point "4", which is directly beneath the compressible resilient member 11, in this case an air bag. Under these conditions the rear axle 14 may have a limited degree of movement relative to the frame member 13 by momentarily deflecting the compressible resilient member 11 without necessarily deflecting the leaf spring 10.

Under medium loads, as shown in FIG. 3, due to the reduced camber or deflection of leaf spring and the reduced height of the compressible resilient member 11, the point of engagement between the slipper end 18 and the cam surface 19 lies somewhere between points "2" and "3", thereby reducing the percentage of total load carried by the air spring or compressible resilient member 11 by approximately 50%. Even though the load sustained by the compressible resilient member 11 is substantially reduced, dynamic deflection can still occur in the air bag thereby reducing and minimizing the possible effect of leaf spring hysteresis.

Under full load conditions, as shown in FIG. 4, the leaf spring means 10 is basically flat, and the point of engagement between the slipper end 18 and the cam surface 19 lies substantially at or somewhere close to point "1", which is almost directly beneath the pivot 20, thereby substantially minimizing the work to be done by the compressible resilient member 11. Under these last load conditions, the air bag of the compressible resilient member 11 will seek a level based on internal pressure as compared to the leaf spring load applied thereto.

In the case of the preferred embodiment wherein the compressible resilient member 11 is a conventional air bag, the captive air may be maintained at a predetermined pressure controlled by a suitable pressure regulating valve. To facilitate the pressure regulation, the cam surface 19 should be so designed as to reduce the effective lever length (i.e. pivot point 20 to leaf spring contact point) in proportion to the increase in load. Since the constant pressure in the bag 11 will exert a constant force, it retains the ability to expand or be compressed dynamically within the hysteresis range of the leaf spring means 10. Alternatively, air pressure changes may be controlled by a leveling valve, which in turn is controlled by the spatial relationship of the axle and frame.

Thus, there is provided, in accordance with the invention, a novel and improved suspension means operative under variable load conditions, having the advantages of a leaf spring suspension for medium and heavy loads along with the low rate characteristics of an air suspension when lightly loaded. Further, the need for tracking bars and/or torque rods normally associated with air suspension systems is eliminated because the leaf spring performs that function. Similarly, sway bars are not required as the front half of the leaf spring means serves that purpose. In addition, the system is substantially "fail-safe," since a deflated air bag in the compressible resilient member 11 would merely convert the composite suspension to a conventional spring suspension.

A still further advantage of the novel suspension means lies in the reduction of "slip" at the slipper end of the leaf spring means 10, due to the fact that the cam means 12 rotates about its pivot and serves as a rocker for part of the elongation which occurs in the leaf spring means 10 when its camber changes.

It will be understood by those skilled in the art that the above-described embodiment is meant to be merely exemplary and that it is susceptible of modification and variation without departing from the spirit and scope of the invention. Therefore, the invention is not deemed to be limited except as defined in the appended claims.

I claim:

1. Suspension means for supporting a first member relative to a second member under variable load conditions, comprising an elongated leaf spring means susceptible of different degrees of deflection and having one end pivotally mounted about a fixed point on the first member, an intermediate point connected to the second member, and an opposite end adapted to be variably coupled to the first member at a point spaced apart from said fixed point; a compressible resilient member having one end connected to the first member and an opposite end adapted to be pivotally coupled to a pivot point on the first member; and cam means for coupling said opposite end of said compressible resilient member to said pivot point and having a cam surface of predetermined configuration for engaging said opposite end of said leaf spring means at one of a plurality of distinct points along said cam surface dependent upon the degree of deflection of said spring means, whereby the proportionate load applied to said compressible resilient member is a function of the overall load sustained by the suspension means and the degree of deflection of said elongated leaf spring means.

2. Suspension means for supporting a vehicle frame member relative to a transverse axle, comprising an elongated leaf spring means susceptible of different degrees of deflection and having one end pivotally mounted about a fixed point on the frame, an intermediate point mounted on the transverse axle, and an opposite end, the deflection of said elongated spring means varying as a function of the load carried thereby; a compressible resilient member having one end fixedly mounted on the frame and an opposite end adapted to be pivotally connected to the frame at a pivot point positioned adjacent said opposite end of said leaf spring means; and cam means having one end pivotally mounted about said pivot point and an opposite end connected to said opposite end of said compressible resilient member and having a cam surface of predetermined configuration intermediate said pivot point and said opposite end of said cam means for engaging said opposite end of said elongated leaf spring means at one of a plurality of distinct points on said cam surface underlying said pivot point and said compressible resilient member, whereby the point of engagement determines the proportionate load carried by said compressible resilient member and said leaf spring means.

3. Suspension means as claimed in claim 2, wherein said compressible resilient member comprises an air bag forming an air spring.

4. Suspension means for supporting a first member relative to a second member under variable load conditions, comprising an elongated leaf spring means susceptible of different degrees of deflection and having one end pivotally mounted about a fixed point on the first member, an intermediate point connected to the second member, and an opposite end adapted to be variably coupled to the first member at a point spaced apart from said fixed point; a compressible resilient member having one end connected to the first member and an opposite end, a cam member having one end pivotally connected to said first member and an opposite end engaging said opposite end of said compressible member, said cam member having a cam surface extending lengthwise of said leaf spring means for engaging said opposite end of said leaf spring means at one of a plurality of distinct points along said cam surface dependent upon the degree of deflection of said spring means, whereby the proportionate load applied to said compressible resilient member is a function of the overall load sustained by the suspension means and the degree of deflection of said elongated leaf spring means.

5. Suspension means as claimed in claim 4, wherein said compressible resilient member comprises an air bag forming an air spring.

References Cited by the Examiner
UNITED STATES PATENTS 2,902,275  9/1959  Hammond et al. _____ 267—31
3,063,732  11/1962  Harbers et al. _____ 200—124

ARTHUR L. LA POINT, *Primary Examiner.*

R. M. WOHLFARTH, *Assistant Examiner.*